United States Patent [19]

Watanabe et al.

[11] Patent Number: 5,765,800
[45] Date of Patent: Jun. 16, 1998

[54] VIBRATION DAMPING APPARATUS

[75] Inventors: Katsuhide Watanabe, Fujisawa; Yoichi Kanemitsu, Fukuoka; Takahide Haga, Kawasaki; Mamoru Suzuki, Fujisawa, all of Japan

[73] Assignee: Ebara Corporation, Tokyo, Japan

[21] Appl. No.: 724,829

[22] Filed: Oct. 2, 1996

[30] Foreign Application Priority Data

Oct. 4, 1995 [JP] Japan .................. 7-282640
Dec. 27, 1995 [JP] Japan .................. 7-353956

[51] Int. Cl.⁶ ........................................ F16M 13/00
[52] U.S. Cl. ............................... 248/550; 248/638
[58] Field of Search .................... 248/550, 638, 248/678, 631

[56] References Cited

U.S. PATENT DOCUMENTS

| | | | |
|---|---|---|---|
| Re. 33,937 | 5/1992 | Schubert | 248/550 X |
| 3,917,201 | 11/1975 | Roll | 248/550 |
| 4,101,102 | 7/1978 | Lloyd | 248/638 |
| 4,497,078 | 2/1985 | Vogel et al. | 248/550 X |
| 4,595,166 | 6/1986 | Kurokawa | 248/550 X |
| 4,662,133 | 5/1987 | Kondo | 248/638 X |
| 4,730,541 | 3/1988 | Greene | 248/550 X |
| 4,796,873 | 1/1989 | Schubert | 248/550 X |
| 4,883,250 | 11/1989 | Yano et al. | 248/550 X |
| 4,976,415 | 12/1990 | Murai et al. | 248/550 X |
| 5,038,835 | 8/1991 | Breyer | 248/550 X |
| 5,042,784 | 8/1991 | Murai et al. | 248/550 X |
| 5,285,995 | 2/1994 | Gonzalez et al. | 248/550 |
| 5,385,217 | 1/1995 | Watanabe et al. | 248/550 X |
| 5,478,043 | 12/1995 | Wakui | 248/550 |
| 5,626,332 | 5/1997 | Phillips et al. | 248/550 X |
| 5,645,260 | 7/1997 | Falangas | 248/550 |

FOREIGN PATENT DOCUMENTS 2-266134  10/1990  Japan .
3-189807   8/1991  Japan .

*Primary Examiner*—Peter M. Cuomo
*Assistant Examiner*—Rodney B. White
*Attorney, Agent, or Firm*—Oblon, Spivak, McClelland, Maier & Neustadt, P.C.

[57] ABSTRACT

A vibration damping apparatus has a vibration-isolating table for placing an object thereon which is to be isolated from vibrations, an air spring mounted on an installation floor and supporting the vibration-isolating table for attenuating vibrations from the installation floor, an air pressure controller for controlling an air pressure of the air spring, a displacement sensor for detecting a relative displacement between the vibration-isolating table and the installation floor and supplying a signal indicative of the detected relative displacement to the air pressure controller, and a spring element acting between the vibration-isolating table and the installation floor for positioning the vibration-isolating table horizontally. An electromagnet is disposed between the vibration-isolating table and the installation floor for actively attenuating vibrations of the vibration-isolating table.

The vibration damping apparatus is operated to position the vibration-isolating table horizontally by means of the spring elements, and vertically by means of the air spring.

3 Claims, 3 Drawing Sheets

VIBRATION DAMPING APPARATUS

BACKGROUND OF THE INVENTION

1. Field of the Invention

The present invention relates to a vibration damping apparatus for supporting and isolating a high-precision system such as a semiconductor fabrication apparatus, an electron microscope, or the like from small vibrations of an installation floor, and also suppressing vibrations of such a high-precision system itself which would otherwise cause yield and measurement accuracy problems.

2. Description of the Prior Art

Heretofore, high-precision systems such as a semiconductor fabrication apparatus, an electron microscope, or the like which should be free of vibrations are supported on vibration damping apparatus in factories, laboratories, etc. Conventional vibration damping apparatus employ air springs and vibration-resistant rubber bodies which have traditionally been used in the art. One modern vibration damping apparatus is a magnetically levitated vibration damping apparatus capable of isolating a high-precision system highly effectively from vibrations. An example of magnetically levitated vibration damping apparatus is disclosed in Japanese laid-open patent publication No. 2-203040.

Another vibration damping apparatus has air springs which support a vibration-isolating table on which a high-precision system is installed, and electromagnets which produce controlled magnetically attractive forces to remove unwanted vibrations. Such a vibration damping apparatus is disclosed in Japanese laid-open patent publication No. 2-266134, for example.

Specifically, the vibration-isolating table is vertically supported by the air springs to prevent vibration of an installation floor from being transmitted directly to the vibration-isolating table. An acceleration sensor mounted on the vibration-isolating table detects vibrations thereof, and the detected vibrations are removed by controlling the magnetically attractive forces that are applied from the electromagnets to magnetic bodies fixedly mounted on the vibration-isolating table.

The vibration damping apparatus which employs air springs and vibration-resistant rubber bodies are capable of attenuating vibrations from the installation floor to a certain extent with respect to a high-precision system such as a semiconductor fabrication apparatus, an electron microscope, or the like which is mounted on the vibration damping apparatus. However, the vibration damping apparatus has a resonant frequency which prevents itself from attenuating vibrations of very low frequency or very small amplitude. Furthermore, any vibrations which are produced by the high-precision system itself that is installed on the floor panel of a vibration attenuating base cannot be removed unless vibrations of the floor panel of the vibration attenuating base are detected and actively eliminated.

The magnetically levitated vibration damping apparatus disclosed in Japanese laid-open patent publication No. 2-203040 employs an electromagnetic actuator which needs to be energized at all times to magnetically levitate a vibration-isolating table, and hence requires a large expenditure of electric energy. The magnetically levitated vibration damping apparatus with such an electromagnetic actuator also needs a backup battery for operating the electromagnetic actuator in case of emergency, and hence complex ancillary equipment for keeping the magnetically levitated vibration damping apparatus active upon an electric power failure. The vibration damping apparatus disclosed in Japanese laid-open patent publication No. 2-266134, in which the vibration-isolating table is supported by the air springs, is free from the above problems.

In the vibration damping apparatus disclosed in Japanese laid-open patent publication No. 2-266134, the vibration-isolating table is vertically positioned by regulating the air pressure in the air springs, but cannot be horizontally positioned. Specifically, the vibration-isolating table is required to be positioned horizontally in X and Y directions such that the magnetic body on the vibration-isolating table will be kept in small limited gaps of the electromagnets out of contact with magnetic poles thereof. The disclosed vibration damping apparatus, however, does not have any active means for positioning the vibration-isolating table horizontally, which is merely supported passively horizontally by the horizontal rigidity of the air springs. The air springs are liable to suffer characteristic variations, tending to positionally displace the vibration-isolating table horizontally due to properties of the rubber thereof or the assembling accuracy thereby to bring the magnetic poles of the electromagnets fixed to the installation floor into contact with the magnetic bodies fixedly mounted on the vibration-isolating table, with a resulting reduction in the vibration-isolating performance or damage to the vibration damping apparatus.

The vibration-isolating table may be positioned horizontally by electromagnets. However, if an object placed on the vibration-isolating table is heavy, then the rigidity of the air springs which support the vibration-isolating table is required to be large, and hence the electromagnets for positioning the vibration-isolating table horizontally are also required to be large in capacity. Consequently, current amplifiers for energizing the electromagnets and a power supply therefor are also required to be large in capacity and dimensions. In addition, the vibration damping apparatus needs a controller for positioning the vibration-isolating table horizontally.

The air springs may be installed in a manner to allow the vibration-isolating table to be positioned horizontally by a horizontal positioning control system. However, such a horizontal positioning control system needs a complex mechanism including actuators for positioning the vibration-isolating table horizontally. The actuators need an installation space therefor, have to be positioned in the installation space, and make the vibration damping apparatus large in size and cost.

SUMMARY OF THE INVENTION

It is therefore an object of the present invention to provide a vibration damping apparatus having air springs, which permits a vibration-isolating table to be positioned in a horizontal direction easily without the use of actuators, prevents the vibration-isolating table supported by the air springs from being brought into contact with actuators on an installation floor, and is capable of attenuating vibrations well in a horizontal direction.

To achieve the above object, there is provided in accordance with the present invention, a vibration damping apparatus comprising an installation floor, a vibration-isolating table for placing an object thereon which is to be isolated from vibrations, an air spring mounted on the installation floor and supporting the vibration-isolating table to bear a substantial proportion of a weight of the object for attenuating vibrations from the installation floor, an air pressure controller for controlling an air pressure of the air spring, a displacement sensor for detecting a relative displacement between the vibration-isolating table and the installation floor and supplying a signal indicative of the detected relative displacement to the air pressure controller, a spring element acting between the vibration-isolating table and the installation floor for positioning the vibration-isolating table in a horizontal direction, an electromagnet disposed between the vibration-isolating table and the installation floor for actively attenuating vibrations of the vibration-isolating table, an acceleration sensor for detecting an acceleration of the vibration-isolating table, and a controller for controlling the electromagnet based on an acceleration signal from the acceleration sensor, which is representative of an acceleration of the vibration-isolating table, to actively attenuate vibrations of the vibration-isolating table.

The controller has an integrating circuit for converting the acceleration signal into a speed signal to actively attenuate fine vibrations of the vibration-isolating table based thereon.

The spring element has a spring constant which is about ⅕ or less of a horizontal spring constant of the air spring.

According to the present invention, the vibration-isolating table of the vibration damping apparatus is positioned horizontally by means of the helical spring, and vertically by means of the air spring. Even if an object placed on the vibration-isolating table is heavy, the helical spring is able to position the vibration-isolating table horizontally at a target position to prevent contacting therebetween. Therefore, it is prevented to damage the vibration damping apparatus by horizontal movement of the vibration-isolating table without a resulting reduction in the vibration-isolating performance.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
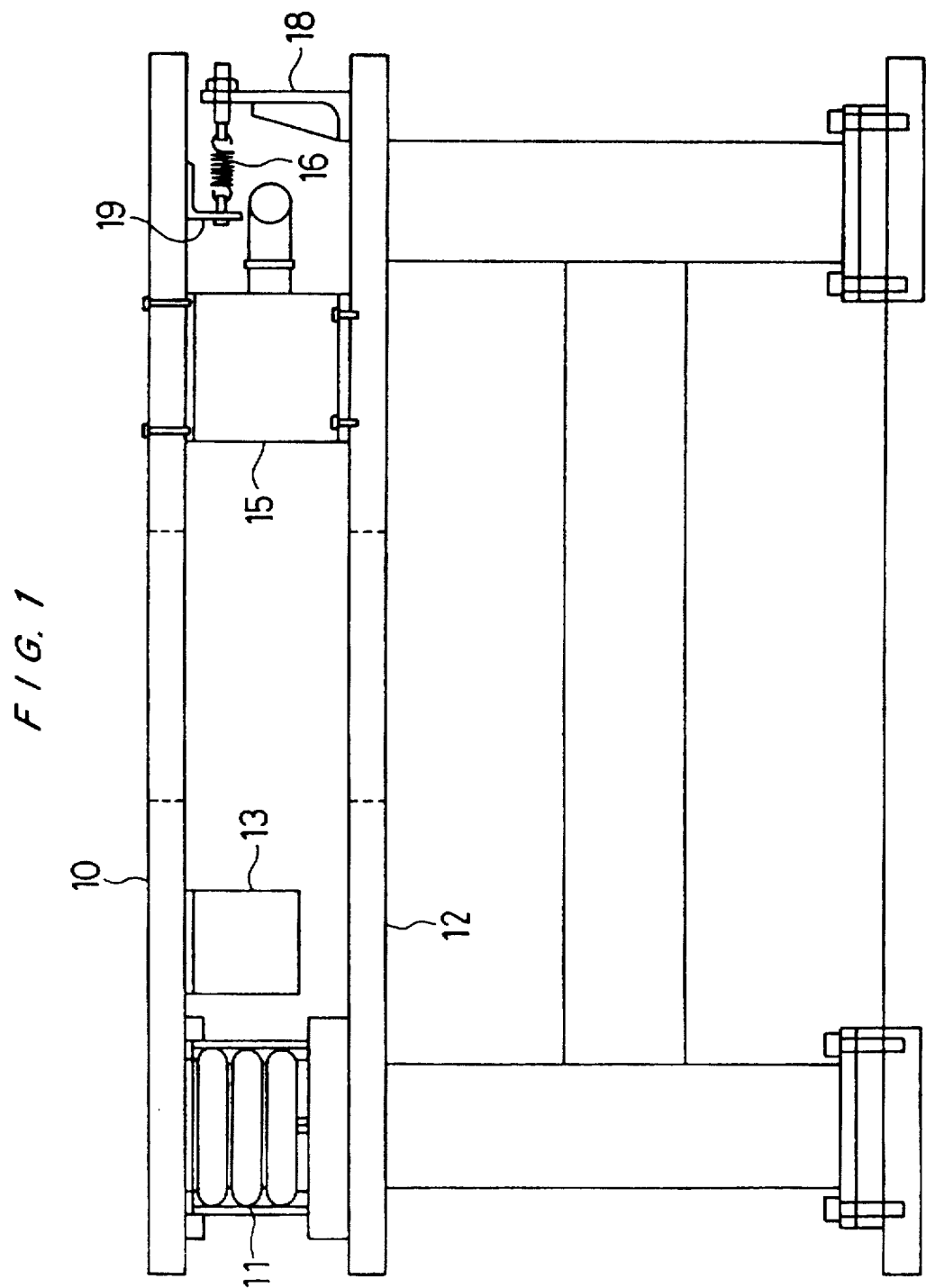
FIG. 1 is a front elevational view of a vibration damping apparatus according to the present invention.
Figure 2:
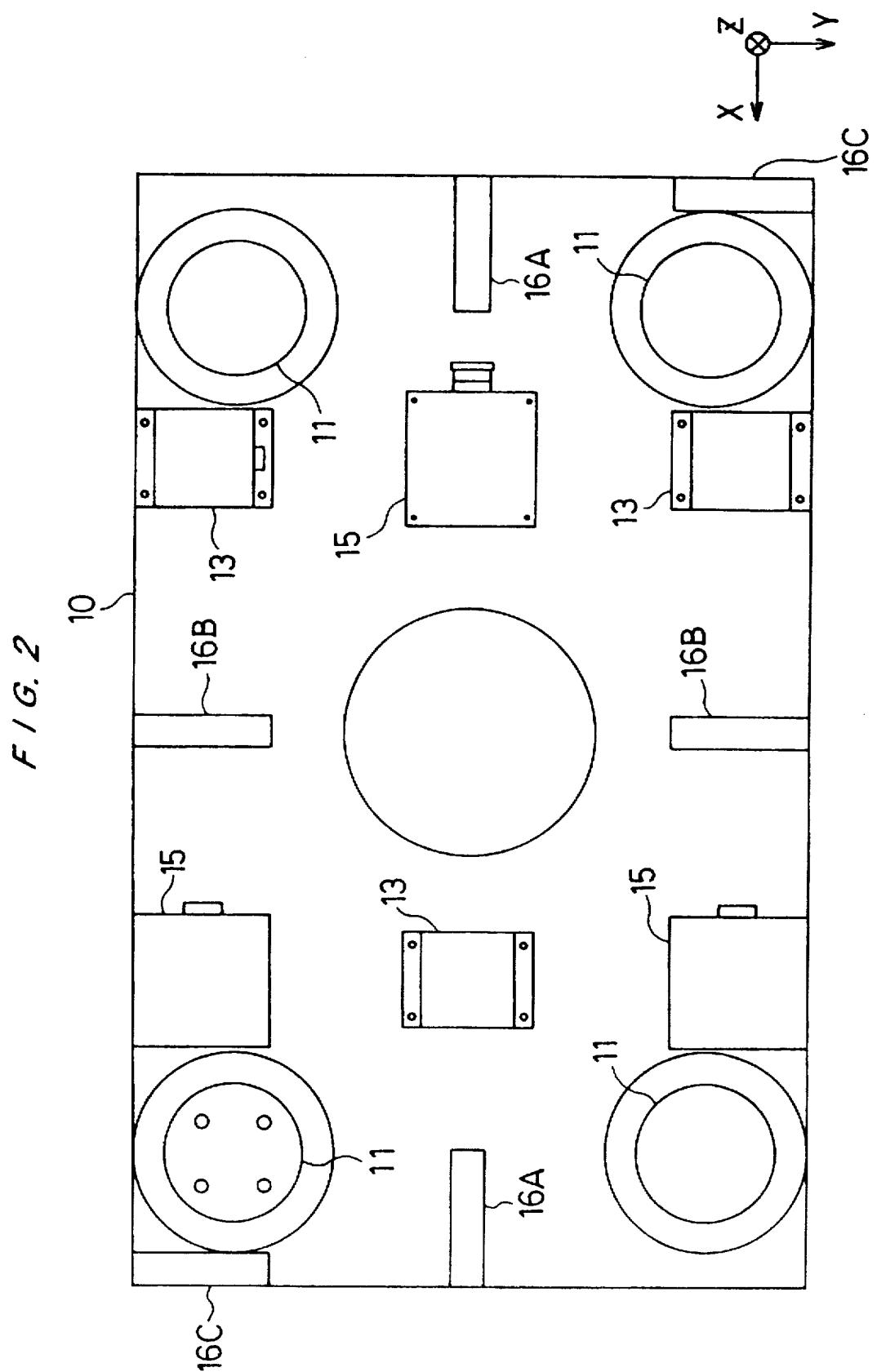
FIG. 2 is a plan view of the vibration damping apparatus according to the present invention.

As shown in FIGS. 1 and 2, a vibration damping apparatus according to the present invention has a vibration-isolating table 10 for supporting a high-precision system such as a semiconductor fabrication apparatus, an electron microscope, or the like, which should be isolated from vibrations. The vibration-isolating table 10 is vertically supported by air springs 11 positioned at its respective four corners. The air springs 11 have lower ends fixed to a common base 12 which is fixedly mounted on an installation floor. Acceleration sensors 13 for detecting accelerations in X and Y directions are mounted on the vibration-isolating table 10.

The air springs 11 are controlled by an air pressure controller (not shown in FIGS. 1 and 2) for vertically positioning the vibration-isolating table 10 based on signals from displacement sensors (not shown in FIGS. 1 and 2). The displacement sensors detect the gaps between the magnetic poles of vertical and horizontal electromagnets of electromagnetic actuators 15 fixedly mounted on the common base 12 and magnetic bodies fixedly mounted on the vibration-isolating table 10. Vibrations detected by the acceleration sensors 13 are fed back to control currents supplied to the electromagnetic actuators 15 for thereby controlling magnetic attractive forces applied from the electromagnetic actuators 15 to the magnetic bodies for attenuating vibrations of the vibration-isolating table 10. The electromagnetic actuators 15 are controlled by a control system which will be described later on.

Six spring-loaded horizontal position correcting mechanisms 16A, 16B, 16C for positioning the vibration-isolating table 10 in the horizontal direction are positioned in the X, Y, and θ directions, wherein the θ direction is a rotational direction in the X and Y (horizontal) plane. Each of the horizontal position correcting mechanisms 16A, 16B, 16C comprises an upstanding leg 18 mounted on the common base 12, a downwardly extending arm 19 mounted on the vibration-isolating table 10, and a helical spring 16 interconnecting the leg 18 and the arm 19. The spring-loaded horizontal position correcting mechanisms 16A, 16B, 16C thus placed in the X, Y, and θ directions produce springs forces effective to balance the vibration-isolating table 10 in the center of the gaps between the magnetic poles of horizontal electromagnets of the electromagnetic actuators 15 and the magnetic bodies.

When a large and heavy object (which may have a weight of several hundred Kg), such as a high-precision system, is placed on the vibration-isolating table 10, the vibration-isolating table 10 is vertically positioned by adjusting the air pressure in the air springs 11 and horizontally adjusted by the spring-loaded horizontal position correcting mechanisms 16A, 16B, 16C. Vibrations detected by the acceleration sensors 13 on the vibration-isolating table 10 are attenuated by controlling the magnetic attractive forces produced by the electromagnetic actuators 15.

The greater the spring constant of the helical springs 16 for positioning the vibration-isolating table 10 horizontally, i.e., the greater the spring forces of the helical springs 16, the easier the horizontal positioning of the vibration-isolating table 10. However, the greater spring forces of the helical springs 16 result in a stronger coupling between the vibration-isolating table 10 and the common base 12, i.e., installation floor. When the installation table is vibrated, therefore, the vibrations are directly transmitted to the vibration-isolating table 10 without being attenuated because of the high vibration transmissibility of the helical springs 16. The greater spring forces of the helical springs 16 also prevent the vibration-isolating table 10 from being positioned horizontally in small strokes.

Conversely, if the spring constant of the helical springs 16 is too small, vibrations of the installation table are not transmitted to the vibration-isolating table 10. However, since the spring forces of the helical springs 16 for positioning the vibration-isolating table 10 horizontally are small, the stroke which the helical springs 16 move horizontally increases and the space in which the helical springs 16 move horizontally also increases. The small spring forces of the helical springs 16 may fail to position the vibration-isolating table 10 in the horizontal direction.

According to the present invention, the spring constant of the helical springs 16 for positioning the vibration-isolating table 10 horizontally is about ⅕ or less of the horizontal spring constant of the air springs 11. With the spring constant thus selected, the helical springs 16 are capable of positioning the vibration-isolating table 10 in small horizontal strokes without an unduly increase in the horizontal rigidity thereof.

Although the above-mentioned embodiment adopts the helical springs as the spring elements of the spring-loaded horizontal position correcting mechanisms, it should be ofcourse possible to adopt any kinds of the spring elements other than the helical springs.

Figure 3:
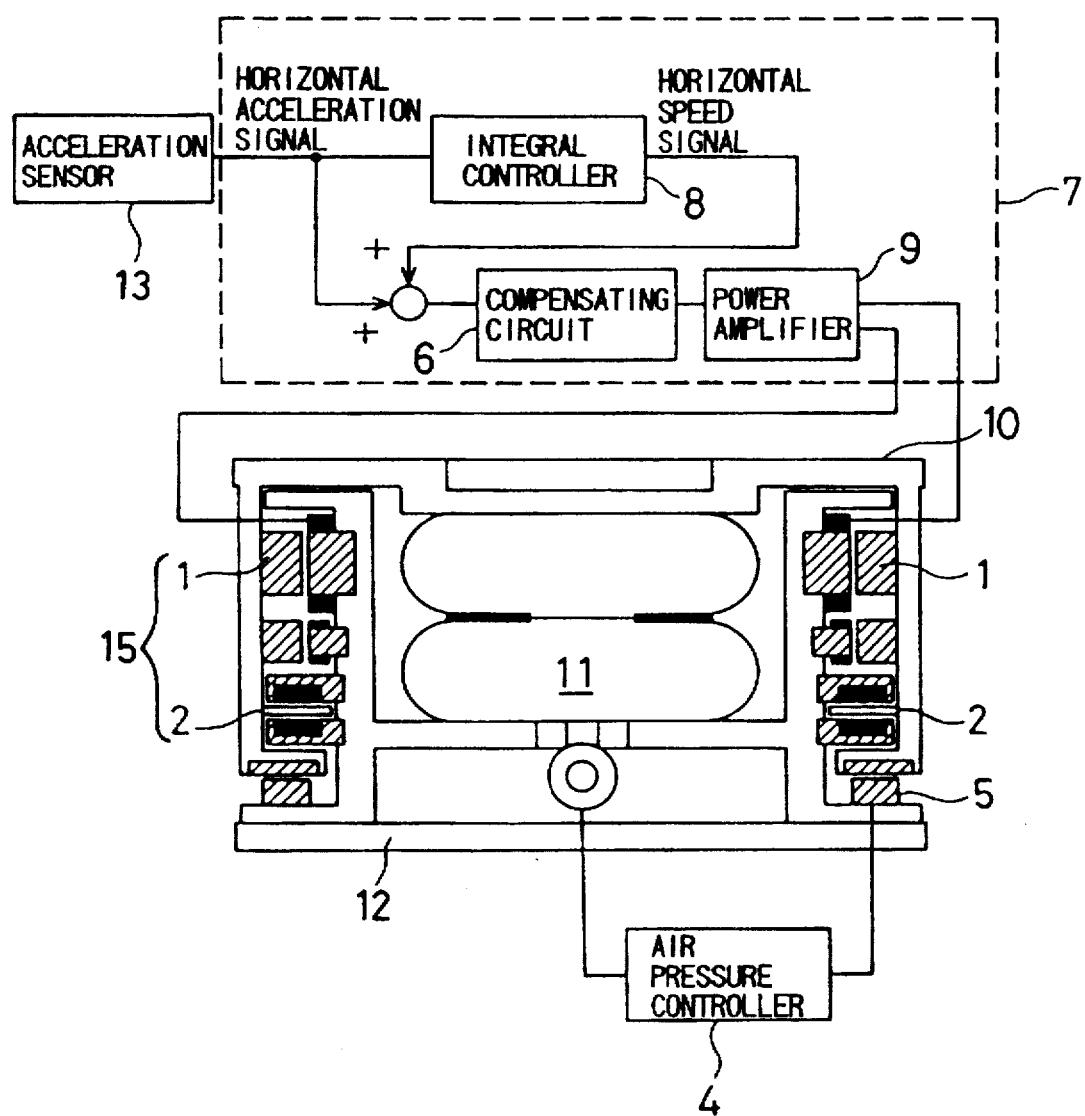
FIG. 3 is a block diagram of a control system for the vibration damping apparatus according to the present invention.

FIG. 3 shows in block form a control system for the vibration damping apparatus according to the present invention.

As shown in FIG. 3, the control system includes a horizontal vibration attenuating controller 7 for attenuating horizontal vibrations of the vibration-isolating table 10. Horizontal acceleration signals from the acceleration sensors 13 are supplied to the horizontal vibration attenuating controller 7, which generates a control signal to control the currents of horizontal electromagnets 1 of the electromagnetic actuators 15 for thereby attenuating horizontal vibrations of the vibration-isolating table 10. Similarly, a vertical acceleration signal from a vertical acceleration sensor (not shown) is supplied to a vertical vibration attenuating controller (not shown), which generates a control signal to control the currents of vertical electromagnets 2 of the electromagnetic actuators 15 for thereby attenuating vertical vibrations of the vibration-isolating table 10.

The horizontal vibration attenuating controller 7 has an integral controller 8 for integrating the horizontal acceleration signals from the horizontal acceleration signals from the acceleration sensors 13 into horizontal speed signals. The horizontal acceleration signals and the horizontal speed signals are multiplied by certain coefficients, respectively, and then added to each other, producing a sum signal. The sum signal is then supplied through a compensating circuit 6 and a power amplifier 9 as an exciting current to the coils of the horizontal electromagnets 1.

The control system shown in FIG. 3 operates as follows:

A high-precision system (not shown) which should be free of vibrations is placed on the vibration-isolating table 10. The air pressure in the air springs 11 is regulated by an air pressure controller 4, which is supplied with an output signal from a displacement sensor 5, to lift the vibration-isolating table 10 off the common base 12. The lifted position of the vibration-isolating table 10 is determined by the spring forces of the air springs 11 and the weight of the vibration-isolating table 10, so that the vibration-isolating table 10 is vertically controlled at a target lifted position by the air pressure controller 4. The vibration-isolating table 10 is horizontally positioned by the helical springs 16.

If the vibration-isolating table 10 vibrates horizontally or vertically, then the horizontal vibration attenuating controller 7 or the vertical vibration attenuating controller controls the magnetic attractive forces of the horizontal electromagnets 1 or the vertical electromagnets 2 based on output signals from the horizontal acceleration sensors 13 or the vertical acceleration sensor for thereby attenuating vibrations of small amplitudes in a low-frequency range.

Although a certain preferred embodiment of the present invention has been shown and described in detail, it should be understood that various changes and modifications may be made therein without departing from the scope of the appended claims.

What is claimed is:

1. A vibration damping apparatus for isolating vibrations of an installation floor comprising:

a vibration-isolating table for placing an object thereon which is to be isolated from vibrations;

an air spring for mounting on an installation floor and supporting said vibration-isolating table to bear a substantial proportion of the weight of the object, for attenuating vibrations from said installation floor;

an air pressure controller for controlling an air pressure of said air spring;

a displacement sensor for detecting a relative displacement between said vibration-isolating table and said installation floor and supplying a signal indicative of the detected relative displacement to said air pressure controller;

a spring element acting between said vibration-isolating table and said installation floor for positioning said vibration-isolating table in a horizontal direction;

an electromagnet disposed between said vibration-isolating table and said installation floor for actively attenuating vibrations of said vibration-isolating table;

an acceleration sensor for detecting an acceleration of said vibration-isolating table; and a controller for controlling said electromagnet based on an acceleration signal from said acceleration sensor, which is representative of an acceleration of said vibration-isolating table, to actively attenuate vibrations of the vibration-isolating table.

2. A vibration damping apparatus according to claim 1, wherein said controller has an integrating circuit for converting the acceleration signal into a speed signal to actively attenuate vibrations of the vibration-isolating table based thereon.

3. A vibration damping apparatus according to claim 1, wherein said spring element has a spring constant which is about ⅕ or less of a horizontal spring constant of said air spring.

* * * * *